Figure 1:
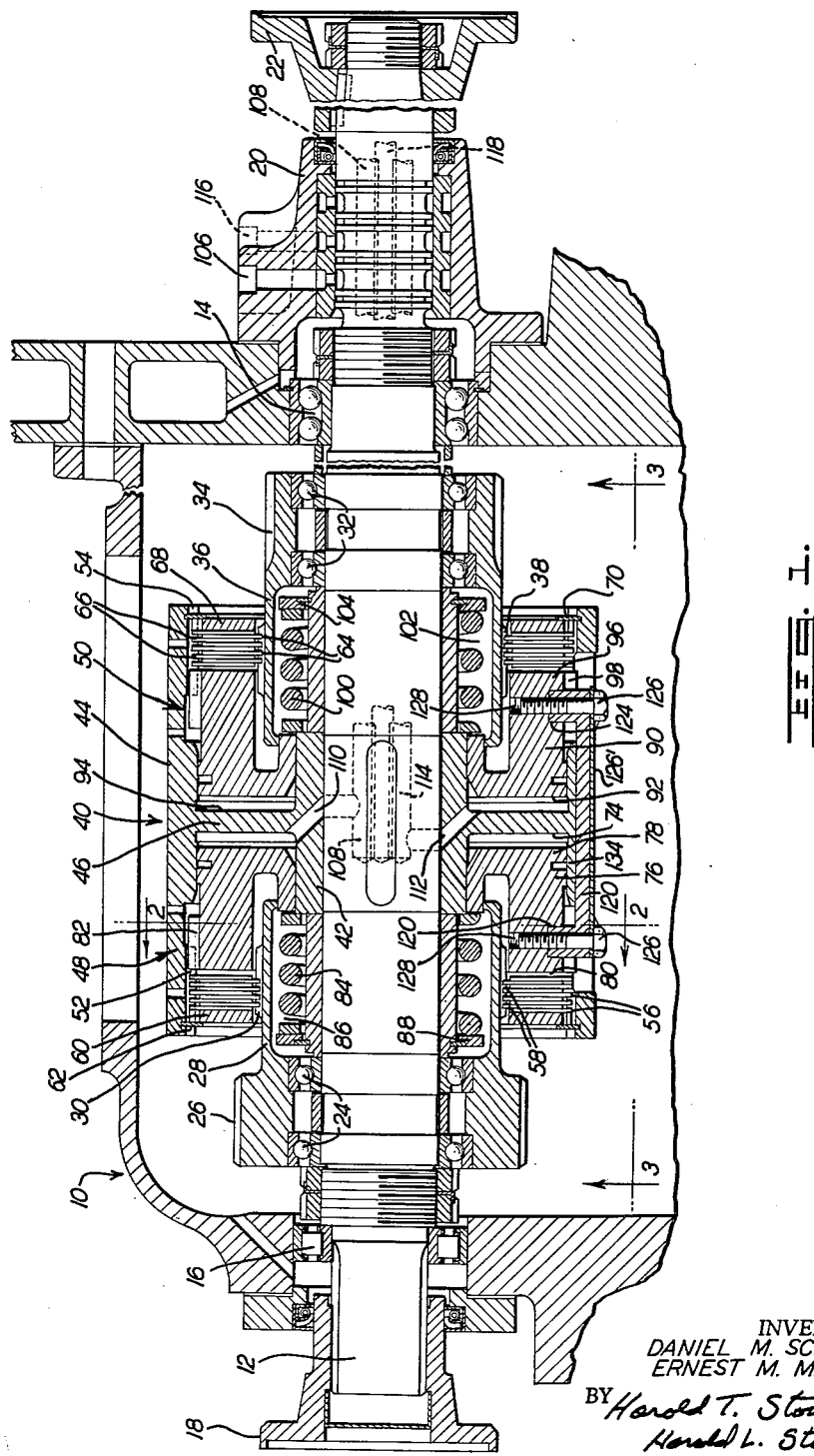

Nov. 20, 1962  D. M. SCHWARTZ ETAL  3,064,781
DUAL PRESSURE FLUID ACTUATED CLUTCH ASSEMBLY
Filed March 31, 1959  3 Sheets-Sheet 1

INVENTORS.
DANIEL M. SCHWARTZ
ERNEST M. MARTIN
BY Harold T. Stowell
Harold L. Stowell
ATTORNEY

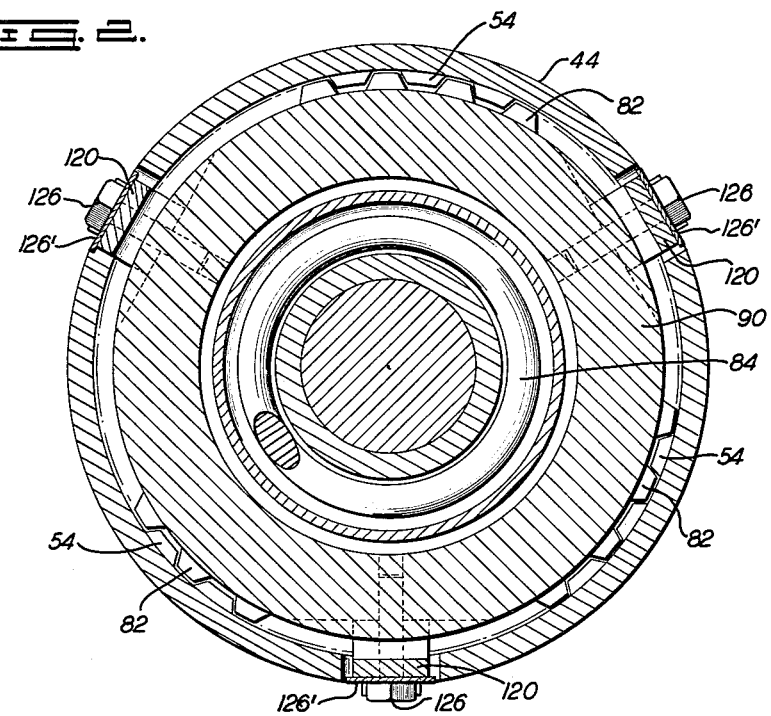
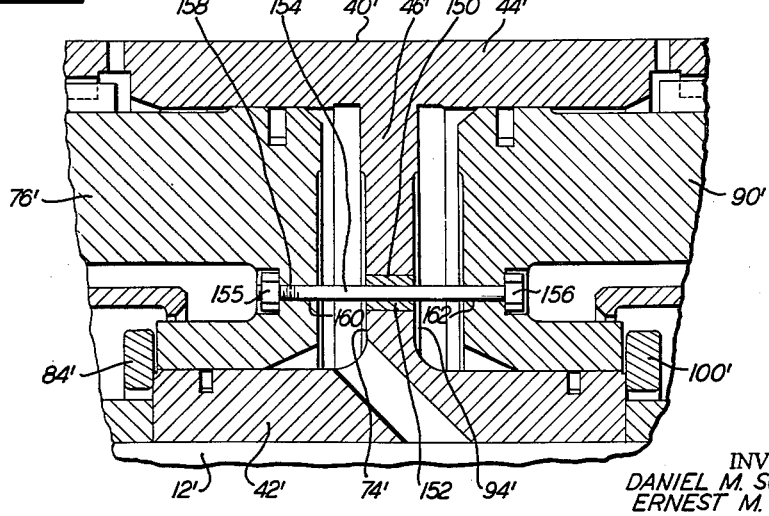

Nov. 20, 1962 D. M. SCHWARTZ ETAL 3,064,781
DUAL PRESSURE FLUID ACTUATED CLUTCH ASSEMBLY
Filed March 31, 1959 3 Sheets-Sheet 3

INVENTORS.
DANIEL M. SCHWARTZ
ERNEST M. MARTIN
BY
ATTORNEY

United States Patent Office 3,064,781
Patented Nov. 20, 1962

3,064,781
DUAL PRESSURE FLUID ACTUATED CLUTCH ASSEMBLY
Daniel M. Schwartz and Ernest M. Martin, Salt Lake City, Utah, assignors to The Eimco Corporation, Salt Lake City, Utah, a corporation of Delaware
Filed Mar. 31, 1959, Ser. No. 803,119
4 Claims. (Cl. 192—87)

This invention relates to improvements in dual pressure fluid actuated clutches and, in particular, to means interconnecting dual pistons of dual pressure fluid actuated clutches for common motion to simultaneously effect engagement of one and disengagement of the other of the dual clutches.

In dual pressure fluid actuated clutches, such as the type often employed in constant mesh change speed and/or reverse gear transmissions where pressure fluid actuated clutches selectively couple rotatably mounted gear wheels to selected shafts, it is often necessary in order to prevent damage to the transmission to insure that one of the clutch assemblies of a dual clutch is disengaged prior to the engagement of the companion clutch assembly. In prior art dual pressure fluid actuated clutches, resilient spring means are often employed as the clutch release means while pressure fluid selectively directed to the cylinders of piston-cylinder assemblies is employed for bringing into frictional engagement spaced radially extending clutch discs.

Failure of one of the clutches to release prior to the actuation of the other clutch is often encountered due to the failure of the pressure fluid to bleed from adjacent the head of the actuating piston due to centrifugal force developed in the rotating clutch housing. One means for improving the release of clutches has been to use heavier clutch release springs. However, the employment of heavier release springs requires higher pressure in the actuating fluid since the effective pressure on the clutch plates is the difference between that obtained from the pressure fluid and the force of the return spring.

It is, therefore, a principal object of the invention to provide means for interconnecting dual pistons of dual pressure fluid actuated clutches, whereby actuation of one piston without release of the other is eliminated.

In general, the present invention comprises a clutch housing, a pair of spaced clutch plate assemblies in said housing, means for selectively bringing the clutch plates of each assembly into frictional engagement, said means comprising fluid pressure actuated piston members mounted for sliding motion in said housing, means interconnecting said piston members for common motion to simultaneously effect engagement of one and disengagement of the other of said clutch plate assemblies.

Figure 3:
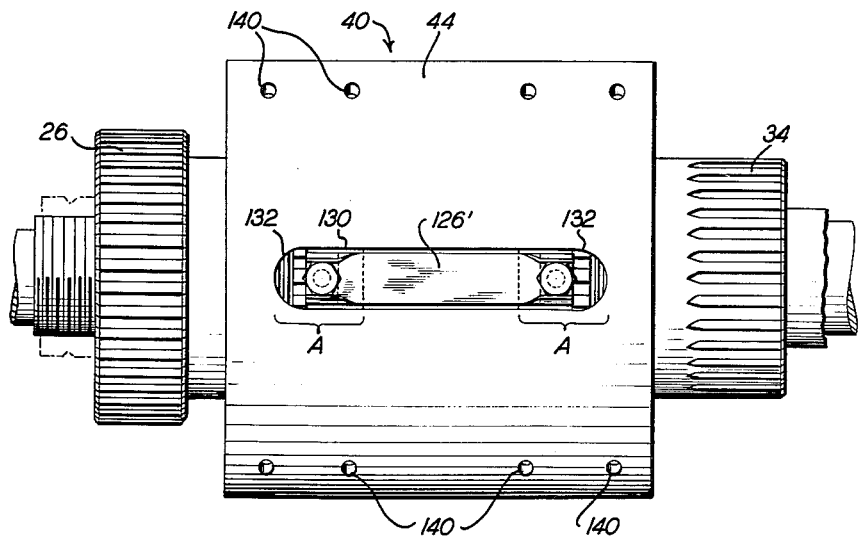
Figure 4:
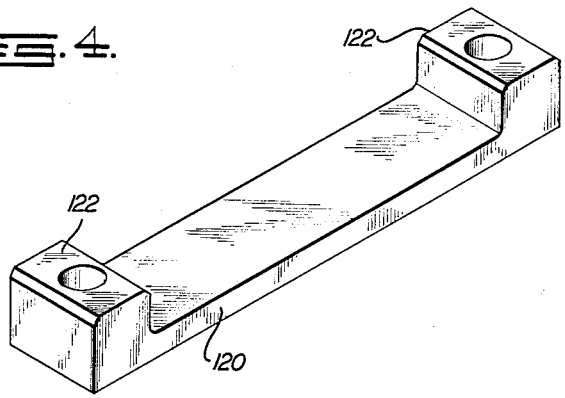

These and other objects and advantages will be more readily appreciated by those skilled in the art from the following detailed description of the present invention as illustrated in the accompanying drawings wherein:

FIG. 1 is a fragmentary elevational view in partial section of one shaft and associated clutch means of a transmission;
FIG. 2 is an enlarged sectional view substantially on line 2—2 of FIG. 1;
FIG. 3 is a section substantially on line 3—3 of FIG. 1;
FIG. 4 is an enlarged perspective view of one form of the tie means for the pair of pistons of the dual clutch assembly illustrated in FIGS. 1 through 3; and
FIG. 5 is an enlarged fragmentary sectional view of a modified form of the present invention.

Referring to the drawings and in particular FIGS. 1 through 4, 10 generally designates a housing for change speed and/or reverse gearing of the constant mesh type such as disclosed in application Serial No. 497,132, D. M. Schwartz et al., filed March 28, 1955, now Patent No. 2,953,941. In the drawings only one shaft designated 12 is illustrated for the purposes of the present invention. Shaft 12 is rotatably mounted in the housing 10 by bearings 14 and 16. One end of the shaft 12 is provided with a flanged coupling half 18 for connection with means for rotating the shaft such as the output shaft of a torque converter or the like. The other end of the shaft is provided with a pressure fluid manifold 20 for directing pressure fluid to the piston-cylinder assemblies of the dual pressure fluid actuated clutch means to be more fully described hereinafter and the said other end of the shaft 12 may also be provided with a flanged coupling half 22 for driving a power takeoff shaft or the like. Rotatably mounted on the shaft 12, within the transmission housing 10 by bearing means 24, is a gear 26. The gear 26 is provided with an inwardly extending shank portion 28 having splines 30 formed in the outer cylindrical surface thereof.

The shaft 12 also rotatably supports, within the housing 10 on bearings 32, a second gear 34. The second gear 34 is provided with an inwardly extending cylindrical shank portion 36 having integrally formed radially extending splines 38. Keyed to the shaft 12 between gears 26 and 34 is a clutch housing generally designated 40. The clutch housing includes an inner cylindrical sleeve 42 keyed to the shaft 12, an outer cylindrical shell 44 and a radially extending wall 46 which wall connects the inner sleeve 42 and the outer shell 44 whereby the housing 40 rotates with the shaft 12.

The outer cylindrical shell 44 and the inner sleeve 42 cooperating with the radially extending wall 46 and the shank portions 28 and 36 of gears 26 and 34 define a pair of opposed clutch compartments 48 and 50 for gears 26 and 34, respectively. The outer cylindrical shell 44 has inwardly projecting splines 52 positioned in opposed relationship to the splines 30 carried by the shank 28 of gear 26. The other end of the outer cylindrical shell 44 has integral splines 54 positioned in opposed relationship to the integral splines 38 carried on the shank portion 36 of gear 34.

The splines 52 in clutch compartment 48 have mounted thereon a plurality of radially extending spaced clutch discs 56. The corresponding splines 30 on shank 28 of gear 26 mount radially extending clutch discs 58 in alternate succession to the housing carried clutch discs 56. Also carried by the splines 52 on the outer cylindrical shell 44 is a clutch disc stop member 60 which is held against axial movement by snap ring 62.

The other clutch compartment 50 is provided with similar gear shank carried clutch discs 64 and clutch shell carried alternate clutch discs 66. A stop member 68 splined to the outer cylindrical shell 44 is held in place by the snap ring 70.

An annular cylinder is defined within clutch compartment 48 between the face 74 of wall 46 and the cooperating clutch discs 56 and 58 which cylinder slidably receives an annular piston 76 having a head portion 78 adjacent face 74 of wall 46. The other end of the piston 76 has formed integrally therewith a presser plate 80 for axially urging the cooperating clutch discs into frictional engagement upon movement of the piston 76 in a direction away from the wall 46.

The piston 76 is provided with peripheral splines 82 which mate with the splines 52 on the outer cylindrical shell 44. The piston 76 is normally urged into the clutch disengaged position by helical spring 84 maintained in a cavity 86 by snap ring and plate assembly 88.

The other clutch compartment 50 is also provided with an annular piston 90 having a head portion 92 adjacent the face 94 of wall 46. The other end of annular piston 90 is provided with an integrally formed presser plate 96 for urging the cooperating clutch discs 64 and 66 into frictional engagement. The piston 90 is provided with peripheral splines 98 which cooperate with the splines 54 formed on the inner cylindrical surface of the outer shell 44 of housing 40.

Piston 90 is urged into the clutch disengaged position by helical spring 100 maintained in an annular space 102 by snap ring and plate assembly 104.

In operation of the dual clutch assembly, pressure fluid from a source of hydraulic fluid under pressure is directed to inlet 106 in the manifold 20 which inlet 106 communicates with an internal bore 108 formed in the shaft 12. The opposite end of bore 108 communicates with the area between the piston head 78 and the face 74 of wall 46 through a generally radially extending passage 110. Similarly, pressure fluid is directed to the space between the head 92 of piston 90 and the face 94 of wall 46 through generally radially extending passage 112 which communicates with axial bore 114. Axial bore 114 communicates with an inlet 116 in the manifold 20 which inlet 116 is connected to a source of pressure fluid.

The other axial bore 118 in shaft 12 provides lubrication for the clutch elements, the gears and the pistons as more fully disclosed in application Serial No. 497,132, D. M. Schwartz et al. filed March 28, 1955.

As hereinbefore discussed, centrifugal force of the pressure fluid in the annular cavity between each piston head and its cylinder head upon high speed rotation of the clutch housing has been found to maintain the clutch discs in engagement overriding the releasing pressure of the clutch return springs even though the supply of pressure fluid is no longer directed to the clutch actuating piston-cylinder assemblies.

It has been found that this difficulty with dual clutch arrangements is eliminated by interconnecting the dual pistons of the dual clutch assembly as illustrated in FIGS. 1 through 4. In FIGS. 1 through 4, piston 76 and piston 90 are interconnected by a plurality of tie rods 120. In this illustrated form of the invention three axially extending circumferentially spaced tie rods are shown; however, it will be apparent that more or less of the tie rods may be employed in the system. Each of the tie rods 120 is provided with end boss elements 122 which engage cooperating slots 124 formed in the annular pistons 76 and 90. The boss elements 122 of each tie rod 120 are maintained in the slots 124 in the respective pistons by threaded bolts 126 which engage internal threads in radial bores 128 formed in the pistons. The heads of the bolts 126 for each tie rod engage a lock plate 126' which overlies each of the tie rods 120.

In order to permit axial sliding movement of the pistons 76 and 90, when interconnected by tie rods 120, axially extending slots 130 are formed in the surface of the outer shell 44 of the clutch housing 40. The machined slots 130 only extend through the outer cylindrical shell 44 in areas adjacent the ends 132 of the slots which areas are designated A in FIG. 3 of the drawings thus providing wall portions 134 beneath the center portion of each of the tie rods 120 so that the tie rods 120 do not interfere with the cylinder walls for the dual annular pistons 76 and 90.

The outer cylindrical shell 44 is also provided with a plurality of radial bores 140 adjacent each set of cooperating clutch discs 56 and 58; and 64 and 66 whereby lubricant for the moving elements of the assembly is centrifugally removed from about the clutch plates thereby reducing clutch drag upon release of the clutches as more fully disclosed in said copending application Serial No. 497,132.

From the foregoing description of one form of the invention, it will be apparent to those skilled in the art that other forms of tie means interconnecting the dual pistons 76 and 90 may be advantageously employed with dual pressure fluid actuated clutch mechanisms, for example, the rigid tie rods 120 may comprise flexible metal cables, or the tie rods 120 may be cast or extruded from plastic such as nylon. It will also be apparent that the dual pistons 76 and 90 may be interconnected through the wall 46. Such a construction is illustrated in FIG. 5 of the drawings where like parts are designated with primed reference numerals corresponding to those employed in FIGS. 1 through 4.

Referring to FIG. 5, the housing 40', which includes the outer cylindrical shell 44', the radial wall 46' and the inner cylindrical sleeve 42' keyed to the shaft 12', slidably receives paired pistons 76' and 90' which are urged by springs 84' and 100', respectively, toward the faces 74' and 94' of the radial wall 46'. One or more axially extending bore 150 is provided in the wall 46 which bore receives a bushing or bearing 152. A bolt 154 is slidably mounted in the bushing 152 which bolt has a head end 156 and a threaded end portion 158. The bolt 152 passes through bore 160 in piston 76' and a bore 162 in piston 90' and is maintained therein by lock nut 155 whereby the dual pistons 76' and 90' are conveniently interconnected and movement of one piston brings about movement in the same direction in the other of the pistons.

It will also be apparent to those skilled in the art that the present invention is not restricted to dual clutches cooperating with paired rotatably mounted gears but the invention finds utility where any dual pressure fluid actuated clutches are employed to perform dual functions. It will also be apparent that with the tie means illustrated, for example, in FIGS. 1 through 4, that the relative positions of the piston heads and the cooperating clutch discs may be reversed and the advantages of the invention will still be fully accomplished.

Having fully described the present invention and specific applications thereof, we claim:

1. A dual pressure fluid actuated clutch including wall means forming a pair of coaxial clutch compartments rectilinearly aligned along their common axes, said clutch compartments including adjacent cylindrical piston receiving portions and remote clutch plate receiving portions, spaced clutch plate assemblies in each clutch plate receiving portion, means for selectively bringing the spaced clutch plate assemblies in each clutch plate receiving portion into frictional engagement, said means including a piston slidably mounted in each cylindrical piston receiving portion, a pressure fluid receiving zone defined by each of said cylindrical piston receiving portions and each of said pistons, means for selectively directing pressure fluid to said pressure fluid receiving zones for urging said clutch plate assemblies into frictional engagement, tie means interconnecting each of said pistons remote from the pressure fluid receiving means, an elongated slot extending through said wall means forming each of the pair of coaxial clutch compartments, a bar adapted to bridge said pressure fluid receiving zones, and means securing said pistons, each to an end of said bar through said elongated slots.

2. A dual pressure fluid actuated clutch including cylindrical and annular wall means forming a pair of annular clutch compartments rectilinearly aligned along their common axes, said clutch compartments including adjacent cylindrical piston receiving portions and remote clutch disc receiving portions, a shaft passing concentrically through said annular clutch compartments, first spaced radially extending clutch discs secured to the cylindrical wall means cooperating to form each of the clutch compartments, second radially extending clutch discs extending between each of the first clutch discs in each of the clutch disc receiving portions, a piston slidably mounted in each cylindrical piston receiving portion, spring means normally urging each of the pistons out of engagement with the spaced clutch discs in each of the clutch disc receiving portions, conduit means connecting each of the cylindrical piston receiving portions to a source of pressure fluid for urging said pistons into engagement with their respective clutch discs against the urging of said spring means, tie means interconnecting each of said pistons, said tie means comprising a bar, slot means in said cylindrical wall means cooperating to form the clutch compartments, and means securing said pistons each to an end of said bar through said slot means.

3. The invention defined in claim 2 wherein said pistons are movable in opposite directions to the clutch-engaged position.

4. A dual pressure fluid actuated clutch including cylindrical and annular wall means forming a pair of coaxial clutch compartments rectilinearly aligned along their common axes, said clutch compartments including adjacent cylindrical piston receiving portions and remote clutch plate receiving portions, a piston mounted for sliding motion in each of the cylindrical piston receiving portions, a clutch plate assembly in said plate receiving portions of each of said compartments, the plates of the plate assemblies adapted to be brought into selective frictional engagement by sliding movement of the pistons, means for directing pressure fluid into fluid pressure areas of said cylindrical piston receiving portions, and tie means interconnecting said pistons for common motion to simultaneously effect engagement of one and disengagement of the other of said clutch plate assemblies, said tie means interconnecting said pistons at points remote from the pressure fluid areas and wherein said tie means comprises a bar, slot means in said cylindrical wall means remote from the fluid pressure areas, and means securing said pistons each to an end of said bar through said slot means.

References Cited in the file of this patent

UNITED STATES PATENTS

| 304,479 | Weston | Sept. 2, 1884 |
| 2,386,220 | Lawler et al. | Oct. 9, 1945 |
| 2,586,220 | Gerst | Feb. 19, 1952 |
| 2,701,042 | Kurzweil | Feb. 1, 1955 |

FOREIGN PATENTS

| 761,460 | Great Britain | Nov. 14, 1956 |